(12) United States Patent
Lürkens

(10) Patent No.: US 7,307,384 B2
(45) Date of Patent: Dec. 11, 2007

(54) CIRCUIT HAVING A SECOND AC/DC CONVERTER

(75) Inventor: Peter Lürkens, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 362 days.

(21) Appl. No.: 10/517,455

(22) PCT Filed: Jun. 6, 2003

(86) PCT No.: PCT/IB03/02146

§ 371 (c)(1),
(2), (4) Date: Dec. 8, 2004

(87) PCT Pub. No.: WO03/107724

PCT Pub. Date: Dec. 24, 2003

(65) Prior Publication Data

US 2005/0219881 A1   Oct. 6, 2005

(30) Foreign Application Priority Data

Jun. 13, 2002   (DE)   ................................ 102 26 213

(51) Int. Cl.
*H05B 37/02*   (2006.01)

(52) U.S. Cl. ...................... 315/212; 315/152; 315/161; 353/13; 353/65

(58) Field of Classification Search ................ 363/125, 363/123, 13, 17, 21.02, 98, 15, 16, 21.03, 363/95, 97, 65; 315/152, 161, 212

See application file for complete search history.

(56) References Cited

U.S. PATENT DOCUMENTS

| 4,388,561 | A | * | 6/1983 | Koshimura et al. | .......... 315/171 |
| 5,134,491 | A | * | 7/1992 | Muraji et al. | ................ 348/744 |
| 5,563,475 | A |   | 10/1996 | Yoon | |
| 6,297,976 | B1 | * | 10/2001 | Isono | ........................... 363/65 |
| 6,670,779 | B2 | * | 12/2003 | Shen | ........................... 315/291 |

FOREIGN PATENT DOCUMENTS

| WO | WO01/33915 | A1 | 5/2001 |
| WO | WO0133915 |    | 5/2001 |

* cited by examiner

*Primary Examiner*—Bao Q. Vu
*Assistant Examiner*—Stuart Hansen

(57) ABSTRACT

A circuit includes a converter for converting an a.c. voltage into a d.c. voltage. The converter has a diode half-bridge, a switch half-bridge, and two d.c. rails. Further, the converter has a second converter for converting the a.c. voltage into a second d.c. voltage.

12 Claims, 3 Drawing Sheets

CIRCUIT HAVING A SECOND AC/DC CONVERTER

The invention relates to a circuit having a converter for converting an a.c. voltage into a d.c. voltage, which converter has a diode half-bridge having two diodes and a first center terminal, a switch half-bridge having two switches and a second center terminal, a high-frequency inductor and two connections in series with the high-frequency inductor, for connection to a source of mains voltage between the two center terminals, a first d.c. rail being connected to the first center terminal by means of a first diode in the diode half-bridge and an electrically conductive connection and to the second center terminal by means of a first switch in the switch half-bridge and an electrically conductive connection, and a second d.c. rail being connected to the first center terminal by means of a second diode in the diode half-bridge and an electrically conductive connection and to the second center terminal by means of a second switch in the switch half-bridge and an electrically conductive connection.

A circuit of this kind is known from WO 01/33915 A1. This circuit has a first converter for converting an a.c. voltage from a mains voltage source into a d.c. voltage. A second converter converts the d.c. voltage into an a.c. voltage that supplies a high-pressure gas-discharge lamp of a data projector. No converter is provided for operating control devices.

It is an object of the invention to improve the circuit and in particular to specify a converter for providing power in a floating low-voltage range.

In accordance with one embodiment, the converter has a second converter for converting the a.c. voltage into a second d.c. voltage. The second converter is integrated in the first converter, thus saving on components for converting voltages.

Advantageously, the mains voltage source, one input of the converter and the high-frequency inductor form a series circuit. The high-frequency current flowing in the high-frequency inductor can thus be used to provide the further, floating voltage supply.

Advantageously, the transmission of energy by the second converter is frequency-dependent. The power emitted at the output of the second converter can be adjusted by changing the frequency. The voltage at the output of the second converter can be set to a desired value in this way.

The converter is advantageously arranged between the high-frequency inductor and the mains voltage source. This makes the converter less susceptible to faults.

The converter may easily have a transformer. The transformer has windings by means of which a desired floating voltage can easily be generated. A rectifier on the secondary side of the transformer converts the a.c. voltage that becomes available initially into a d.c. voltage of the kind required for the operation of electronic signal circuits.

The converter may easily have a resonant capacitor. The energy transmission through the second converter can easily be acted on by means of the resonant capacitor and by approximate matching of the switching frequency of the switch half-bridge to the resonant frequency. In a first embodiment, the resonant capacitor is connected in parallel with the input winding of the transformer. In a second embodiment, the resonant capacitor is situated in a connection between a center-point of the high-frequency inductor and the transformer, and one of the two d.c. rails.

The converter advantageously has a control means that controls the frequency at which the transistors in the switch half-bridge are switched alternately on and off to be within a range from 50 Hz to 1000 kHz, and advantageously to be within a range from 200 to 800 kHz and in particular of between 300 and 580 kHz. The high switching frequency allows the reactive component of the converter to be made particularly small. If, by selecting suitable switched-on/off times, the current waveform is selected to be such that the sign of the current in the high-frequency inductor reverses twice in each high-frequency switching cycle, it is possible to cause the switch half-bridge to operate with particularly low losses. Also, by changing the lengths of time for which the switches are switched on and off, it is possible to alter the mean value of the converter current, i.e. the current from the converter without the high-frequency variations, within wide limits. The switched-on/off times are usefully set in such a way as to produce a current waveform on the current supply system that is similar to a sine wave. The control means reduces the difference between the operating frequency and the frequency at which energy transmission is a maximum if the output voltage from the second converter is lower than desired, and it increases the difference between the operating frequency and the frequency at which energy transmission is a maximum if the output voltage from the second converter is higher than desired.

During the positive mains half-wave:
a current reference value is formed that corresponds to an instantaneous value of the current in the high-frequency inductor that is less than zero;
a drop below the reference value causes the first switch to switch off and the second switch to switch on;
a frequency is formed that is higher, the greater the amount by which the output voltage from the converter is above the desired output voltage;
the occurrence of a pulse of the frequency mentioned causes the second switch to switch off and the first switch to switch on;
the switched-on time of the first switch may not drop below a predetermined minimum time.

And during the negative half-wave
a current reference value is formed that corresponds to an instantaneous value of the current in the high-frequency inductor that is greater than zero;
a rise above the reference value causes the second switch to switch off and the first switch to switch on;
a frequency is formed that is higher, the greater the amount by which the output voltage from the converter is above the desired output voltage;
the occurrence of a pulse of the frequency mentioned causes the first switch to switch off and the second switch to switch on;
the switched-on time of the second switch may not drop below a predetermined minimum time, wherein the mains voltage is counted as positive if the potential of the mains connection on the diode-bridge side is below the potential of the other connection, and currents in the mains voltage source, the converter and the high-frequency inductor are counted as positive if they flow in the direction towards the switch half-bridge.

The converter advantageously has an input capacitor from which an input voltage becomes available during the passage through zero of the mains supply. This ensures a flow of current for each half-wave and particularly for the passage through zero of the voltage from the mains supply source and hence a continuous power output for the second converter. At the same time it reduces the proportion of undesirable high-frequency currents that make their way from the converter onto the current supply system.

The voltage at the input capacitor is advantageously so limited by the control means that its value is neither zero nor the same as that of the converter output voltage. This can for example be achieved by preventing the duty factor, also referred to below as the duty cycle, of the switches in the second half-bridge from going outside a certain range of values, e.g. 5% to 95%. The duty factor is defined as the ratio of the length of time for which a switch is switched on to the overall length of a switching cycle. The limiting of the voltage at the input capacitor is advantageously achieved by limiting the duty factor of the switches and of the switch-bridge independently of current. The control means sets the mean current of the converter in such a way that neither the voltage at the input capacitor nor the difference between the voltage at the input capacitor and the output voltage of the converter drops below a minimum value.

These and other aspects of the invention are apparent from and will be elucidated with reference to the embodiment described hereinafter.

Figure 1:
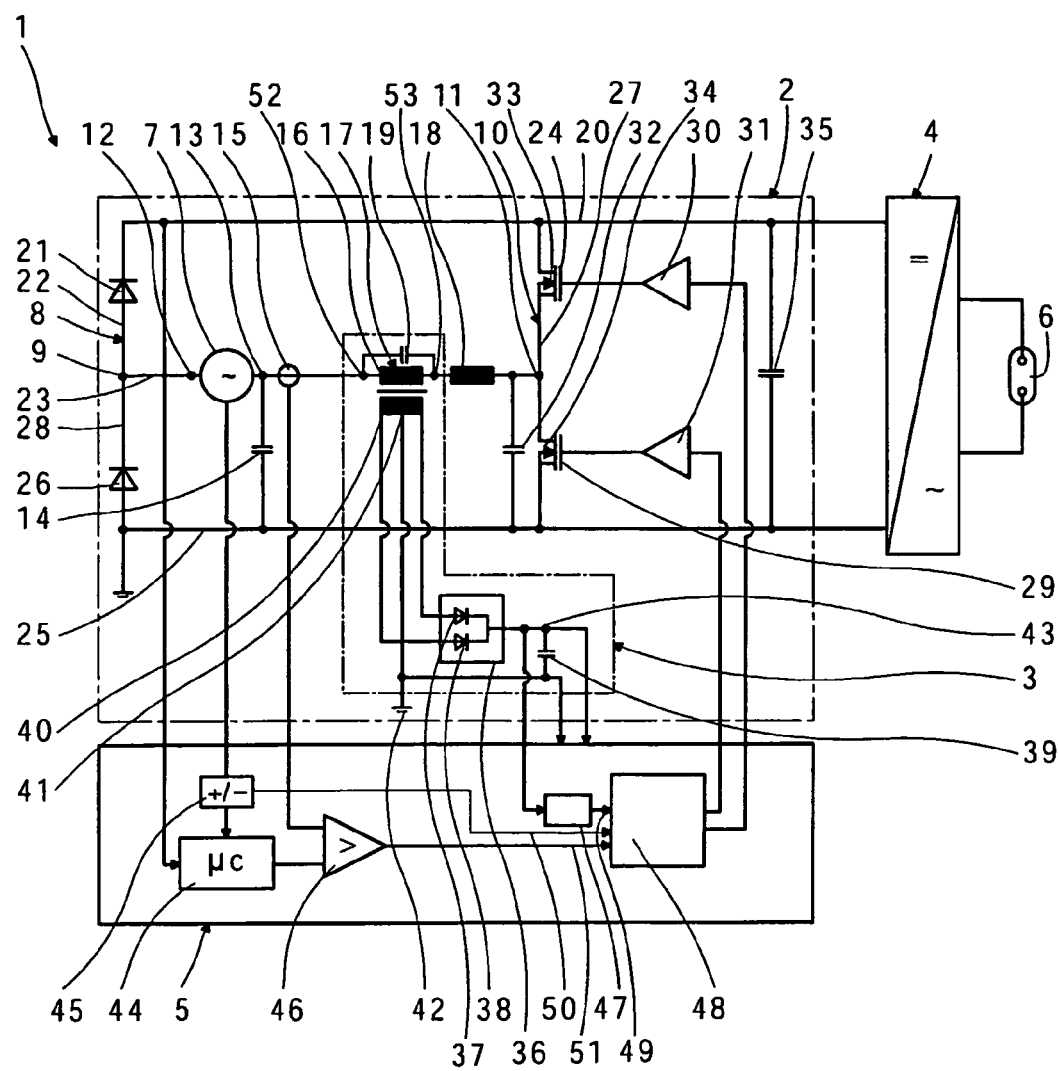
FIG. 1 shows a circuit having a discharge lamp.

FIG. 1 shows a circuit 1 having converters 2, 3 and 4, a control means 5 and a high-pressure gas-discharge lamp 6. The converter 2 is fed by a mains voltage source 7 and converts the a.c. voltage therefrom into a d.c. voltage. The converter 2 has a passive diode half-bridge 8, also referred to below as a diode bridge, having a center terminal 9, and a field-effect-transistor half-bridge 10, also referred to below as a FET bridge, transistor bridge or switch bridge, having a center terminal 11. The mains voltage source 7 has two connections 12 and 13. Connection 12 is connected to the center terminal 9 of the diode bridge 8. Connection 13 is connected to an input capacitor 14 and, via a series circuit comprising a current measuring member 15, a winding 16 of a transformer 17 and a high-frequency inductor 18, to the center terminal 11 of the switch bridge 10. A resonant capacitor 19 is connected in parallel with the transformer winding 16. Connection 13 is also referred to as the input of the converter 2. Winding 16 and inductor 18 both take the form of coils and form a coil combination 16, 18. The center terminal 11 is also referred to as the right-hand end of coil combination 16, 18.

A first d.c. rail 20 is connected to the center terminal 9, and hence to the mains voltage source 7, by means of a first diode 21 in the diode bridge 8 and via electrically conductive connections 22 and 23. The first d.c. rail 20 is also connected to the center terminal 11 of the transistor bridge 10 by means of a semiconductor power switch 24, also referred to below as a switch or transistor.

A second d.c. rail 25 is connected to the center terminal 9, and hence to the mains voltage source 7, by means of a second diode 26 in the diode bridge 8 and via the electrically conductive connection 23 and via a further electrically conductive connection 28. The second d.c. rail 25 is also connected to the center terminal 11 of the transistor bridge 10 by means of a semiconductor power switch 29, also referred to below as a switch or transistor. The center terminal 11 is connected to power switches 24 and 29 by means of an electrically conductive connection 27.

The transistors 24 and 26 are operated by the control means 5 via drivers 30 and 31. A commutating capacitor 32, for limiting the rate-of-change of the voltage when the current is switched from switch 24 to switch 29 or vice versa, also referred to as a dV/dt capacitor, advantageously reduces the losses occurring when the current from the high-frequency inductor is switched from one to the other of the switches 24 and 29. Also, high-frequency noise originating from the switching is reduced in this way. An output capacitor 35 is arranged between the two d.c. rails 20 and 25 and smoothes an output voltage from the converter 2. The voltage on this capacitor corresponds to a first output of the converter. It also acts as an energy store for the periods during which the mains voltage is close to zero. There is normally a voltage of 400 volts on rails 20 and 25 and this is supplied to the third converter 4. The converter 2 is thus a boost converter that conveys energy from the mains voltage source of low voltage to a load at higher voltage. The third converter 4 converts the d.c. voltage of 400 volts into a regulated a.c. current and supplies the discharge lamp 6 therewith.

The converter 3 comprises the transformer 17 with its winding 16, the resonant capacitor 19, a rectifier 36 comprising two diodes 37 and 38, and a smoothing capacitor 39. The transformer 17 also has a second, floating winding 40 the ends of which are connected to respective ones of the diodes 37 and 38. A center tapping 41 of the winding 40 sets up a ground potential 42. The diodes 37 and 38 are connected to the ends of the floating winding 40 and are so connected that they rectify an a.c. voltage induced in the floating winding 40. Between an output 43 of the rectifier 36 and the ground potential 42 is the smoothing capacitor 39 and a voltage of 5 volts. The circuit shown, which is responsible for so-called half-wave rectification, is particularly suitable for low output voltages. As well as this, there are also other possible configurations for the output side of the transformer, and particularly full-wave rectification or circuits having further tappings or additional output-side windings to provide a plurality of different output voltages that bear a fixed relationship to one another. The output 43 is particularly suitable for supplying the different signal components of a projector, e.g. microprocessors, with current, because the signal section typically has a metallic connection to freely accessible connecting sockets and isolation is therefore required from the a.c. mains supply. It is also advantageous for the transformer to be inserted not at the center terminal of the switch bridge but at the side of the mains connection. Because it is only low amplitudes of a.c. voltage of a sine-wave-like form that occur here, considerably less high-frequency noise can be expected than in the other case. For the same reason, the measurement of the input current to the converter also takes place at the point where the transformer is connected to the input capacitor.

The control means 5 has a microcomputer 44 having a processor and memory peripheral, a detection circuit 45, a comparator 46, a voltage-controlled oscillator 47 and a logic circuit 48. Electrically conductive signal lines 49, 50 and 51 run from the voltage-controlled oscillator 47 to the logic circuit 48, from the detection circuit 45 to the logic circuit 48 and from the comparator 46 to the logic circuit 48.

Connections 52 and 53 form an input 52, 53 of the converter.

Figure 2:
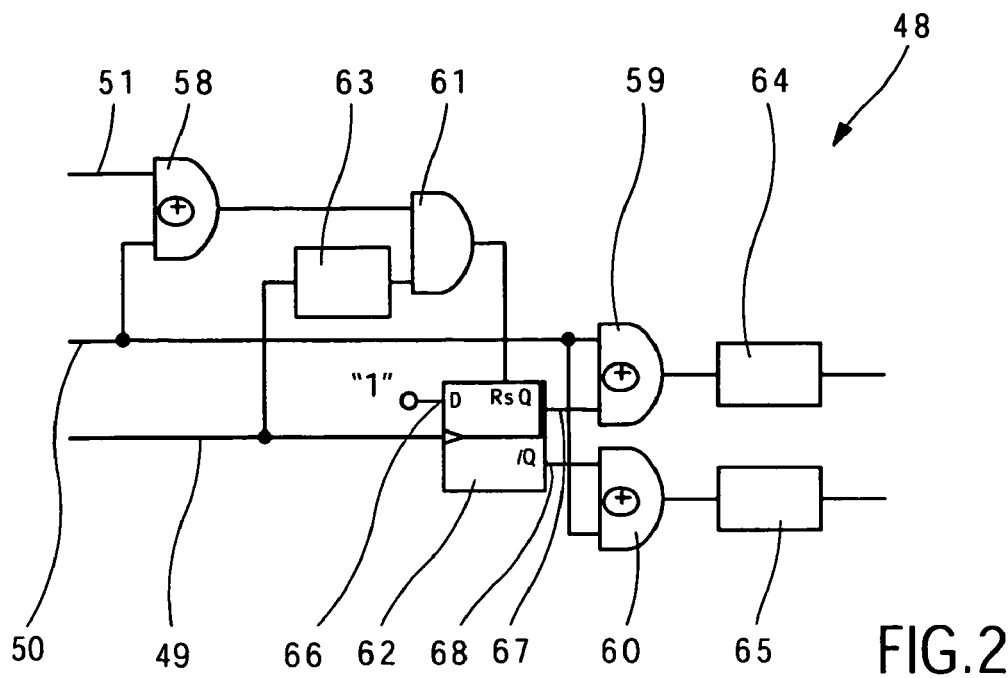
FIG. 2 shows a logic switching circuit having gating devices.

FIG. 2 shows the logic circuit 48, which has three exclusive-OR gates 58, 59 and 60, an AND gate 61, a D flip-flop 62 and three delay elements 63, 64 and 65, which will be referred to below as gating members 58, 59, 60, 61, 62, 63, 64 and 65. The D flip-flop 62 has an input 66 (the D input) that is always set to logic "1", also referred to in what follows as logic "High". The D flip-flop 62 also has an output 67 and a negated output 68. The exclusive-OR gates 58, 59 and 60 are also referred to below as ExOR gates.

Figure 3:
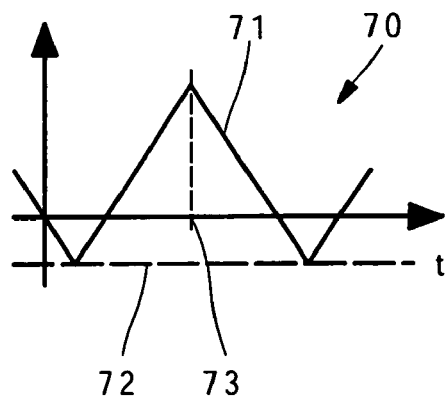
FIG. 3 is a plot against time, showing a current waveform in the high-frequency inductor during the positive half-wave.

FIG. 3 shows a plot against time 70 for a mains voltage greater than zero, in which a segment of the current waveform 71 in the high-frequency inductor is plotted against time. The current waveform is zig-zag in shape and switches at a frequency of between 310 kHz and 550 kHz. A reference value 72 marks a lower limit for the current, also referred to below as a threshold. If the current drops below this limit, the switch half-bridge 10 is changed over, meaning that switch 24 is switched off and switch 29 is switched on, whereupon the current rises again. At another point in time 73 the switch half-bridge 10 is changed over again, meaning that switch 29 is switched off and switch 24 is switched on, whereupon the current falls again.

Figure 4:
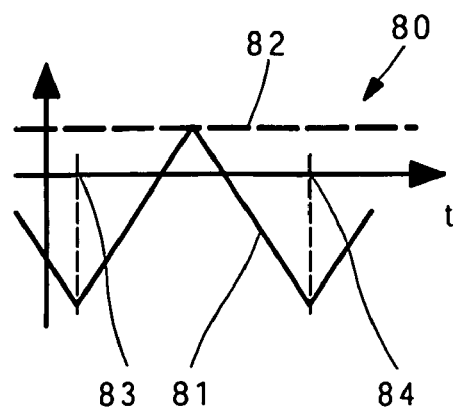
FIG. 4 is a second plot against time, showing a second current waveform in the high-frequency inductor during the negative half-wave.

FIG. 4 shows a plot against time 80 for a mains voltage smaller than zero, in which a segment of the current waveform 81 in the high-frequency inductor 18 is plotted against time. The current waveform is zig-zag in shape, with a reference value 82 marking an upper limit for the current. If the current rises above this limit, the switch half-bridge 10 is changed over, meaning that switch 29 is switched off and switch 24 is switched on, whereupon the current falls again. At points in time 83 and 84 the switch half-bridge 10 is changed over again, meaning that switch 24 is switched off and switch 29 is switched on, whereupon the current rises again.

Figure 5:
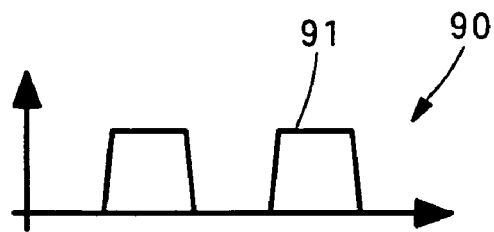
FIG. 5 shows a signal waveform at the output of a circuit for detecting the polarity of the mains voltage.

FIG. 5 shows a plot against time 90 of a voltage signal 91 that arises on the line 50. The signal 91 is set to logic "1" when the mains voltage is greater than zero and is generated by the detection circuit 45.

Figure 6:
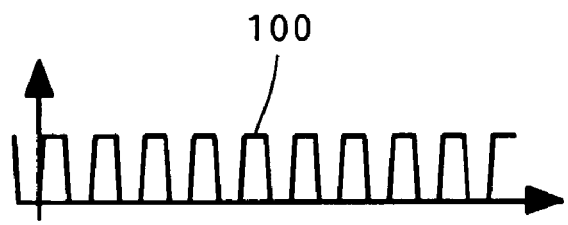
FIG. 6 shows a switching signal.

FIG. 6 shows a switching signal 100 from the voltage-controlled oscillator 47 that arises on the line 49 and that switches the D flip-flop 62 at its clock input.

Figure 7:
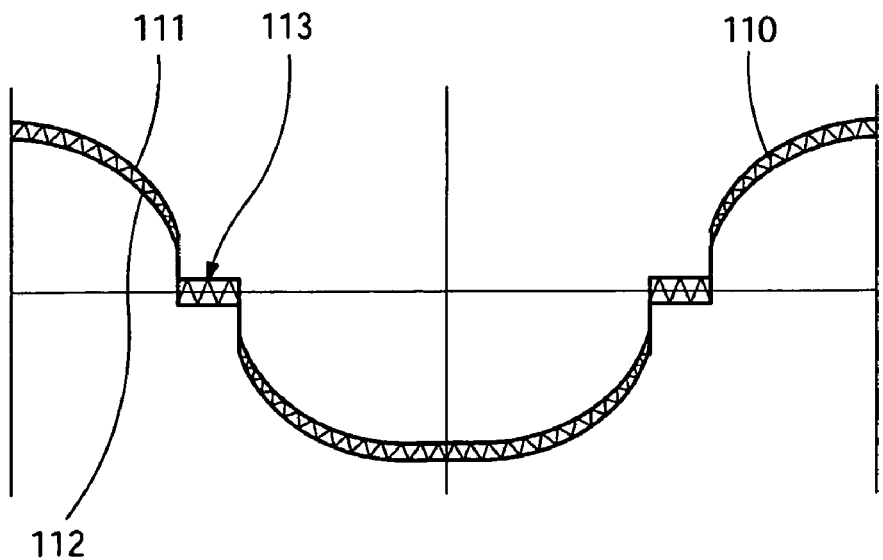
FIG. 7 shows a waveform for the mains current, contained within envelope curves.

FIG. 7 shows a zig-zag current waveform 110 at the voltage source 7. The current waveform is defined by envelope curves 111 and 112 that are of a sine-wave-like shape. The frequency of the two envelope curves is 50 to 60 Hz and corresponds to the frequency of the mains voltage. At the passage through zero of the mains voltage there is a time domain 113 in which the current waveform varies about zero, which means that the mean mains current disappears in this domain.

The operation of the circuit 1 can be described as follows: A mains frequency for the mains voltage source is between 50 and 60 Hz. An operating frequency for the converter 2 is between 310 and 550 kHz and is determined by a switching cycle of the transistors 24 and 29. A resonant frequency of a circuit comprising the coil combination 16, 18 and the resonant capacitor 19 is 310 kHz.

The control means 5 controls the operating frequency and the duty factor of the converter 2. If the operating frequency is raised to up to 550 kHz, the operating frequency moves away from the resonant frequency, with the result that the current at the output of the converter 3 drops. If the operating frequency is lowered to down to 310 kHz, the operating frequency approaches the resonant frequency, with the result that the current at the output of the converter 3 rises. It is useful for the range of operating frequencies of the voltage-controlled oscillator 47, also referred to for short as a VCO, to be restricted to frequencies above resonance, because below this point the energy transmission to the secondary side of the transformer drops again. This would be equivalent to a reversal of the sign of the direction of control, which could easily lead to instability and oscillation.

The control means 5 thus controls frequency within a frequency range, in such a way that an adequate energy supply is established for the signal section of a device in the field of office or consumer electronics. In particular, frequency is adjusted in such a way that the output voltage of the converter 3 is constant. Devices of this kind are data and video projectors, television systems or computers with monitors. The monitors are produced with flat screens having a liquid crystal display, or LCD for short, or are fitted with cathode-ray tubes. In an LCD monitor for example, the background lighting could take the place of the high-pressure gas-discharge lamp, while the signal section would be comparable to that of a projector.

In normal operation, the output voltage of the converter 2 is 400 volts. The maximum voltage occurring on the mains supply is approximately 360 volts.

A positive half-wave of the mains supply voltage means that a plus sign can be assigned to output 13 and a minus sign to output 12. The diode 21 blocks and the diode 26 are switched to conduct. Because the mains frequency is virtually zero compared with the operating frequency, the instantaneous value of the mains voltage can be considered constant for a few switching cycles of the converter. The operation of the converter 2 as a function of the control means 5 for one switching cycle of the transistors 24 and 29 can then be described as follows:

If transistor 24 is switched on, there is present at the input 13 of the converter 2 the instantaneous value of the mains voltage and at the right-hand end of the coil combination 16, 18 the output voltage of the converter 2, which is always greater than the highest mains voltage that occurs. The voltage through the coil combination 16, 18 is thus opposite to the positive current direction and the current is driven in the direction of the voltage source 7. The current becomes smaller or more negative. The current becomes lower than the threshold 72 that is set by the microcomputer 44, and the comparator 46 switches. The logic circuit 48 switches the transistor 24 off and, after a dead time, the transistor 29 on.

After the switching of transistors 24 and 29, the voltage at the center terminal 11, i.e. at the right-hand end of the coil combination 16, 18, is zero volts. It is now assumed that the mains voltage source is at a point other than the passage through zero. The voltage at the input 13 of the converter 2 is then higher than at the center terminal 11 of transistors 24 and 29 and the current rises. The phase of the current rise is limited by VCO 47. After a defined period of time, VCO 47 generates a pulse at a time 73. Transistors 24 and 29 are switched back again by the logic circuit 48, i.e. after a dead time transistor 29 is switched off again and transistor 24 is switched on again.

In a negative half-wave of the mains supply, diode 21 is switched to conduct and diode 26 blocks. The control functions of the control means 5 are now interchanged, and the functions of the VCO 47 and the comparator 46 in particular are interchanged.

In one switching cycle of transistors 24 and 29, the VCO 47 switches transistor 29 off and transistor 24 on at times 83 and 84. The comparator 46 switches transistor 29 off and transistor 24 on when the threshold 82 is reached.

Hence what is brought about by the switching of transistors 24 and 29 is that there is always a high-frequency a.c. voltage present at coil combination 16-18. This principle continues to apply even when the voltage from the voltage source 7 is at a passage through zero. The voltage differential is then maintained by means of the capacitor 14. When the mean input current to the converter is set to zero in the vicinity of the passage through zero, diodes 21 and 26 block and thus cut off the mains voltage source 7 from the converter 2. It is however very difficult for the current to be set to exactly zero by a current-regulating means. It is easier for this to be done by limiting the duty factor of switches 24 and 29. Duty factor is defined as the ratio of the particular switched-on time to the total length of a switching cycle. The mean voltage at a coil combination has to be zero for quite a long period if the current is to be limited, and particularly if its mean is to be constant. So, if the duty factor of the switch 24 is 10% and the duty factor of the switch 29 is thus 90%, what this means is that the mean voltage at the center terminal 11 of the switch bridge 10 is 10% of the output voltage of the converter 2. The input current then changes until such time as the input voltage too has reached the same mean value. If the mains input voltage drops below this value during the positive half-wave, the converter input current should become negative. This however is not permitted by the diode 26. The mains current and hence the mean converter input current is therefore set to zero at this moment and the voltage at the input capacitor 14 remains constant.

What is achieved by means of the delay element 63, is that the duty factor of the transistor 29 cannot rise to more than 90% during the positive mains half-wave and cannot drop below 10% during the negative mains half-wave. In this way, it is ensured that the voltage at the capacitor 14 cannot drop below 10% of the output voltage of the converter 2 during the positive mains half-wave and cannot rise to more than 90% of the output voltage during the negative mains half-wave. The effective voltage at the resonant section of the circuit is thus always higher than 40 V. The duty cycle and the limiting of the duty cycle can be achieved by means of the gating elements 58, 59, 60, 61, 62, 63, 64 and 65. The delay time applied by delay element 63 in conjunction with the VCO frequency is, in particular, a crucial factor in the limiting of the duty factor.

The delay elements 64 and 65 each delay the rising edge of an input signal but not its decaying edge. The delay elements 64 and 65 may be implemented by means of counters or multivibrators, also referred to in what follows as retriggerable monostable multivibrators.

The operation of the logic circuit 48 can then be described as follows, making particular allowance for the setting of the duty factor:

If the mains voltage and mains current are positive, the signal 91 is at logic "High" and diode 26 conducts. The positive-going edge from the VCO 47 then sets the D flip-flop 62, the output 67 of which goes to the logic "1" state whereas its negated output 68 becomes logic "0". Because the signal on the signal line 50 that is applied to a second input of the exclusive-OR gate 59 is set to logic "High", logic "0" is produced at an output of the exclusive-OR gate 59. This state is immediately passed on by the delay element 64 to the power transistor 29. Logic "1" is produced at the output of ExOR gate 60 and this signal is passed on to transistor 24 by delay element 65 with a delay. The delay to the signal ensures that the two transistors 24 and 29 can never be conductive simultaneously.

The moment described is the moment represented by time 73 on time plot 70. Because the output voltage at the output 11 of the converter 2 counteracts the mains voltage and the mains current via the switched-on transistor 24, the current in the coil 18 begins to fall, as shown in current waveform 71. When the value of the current drops below the reference value 72 set in the microcomputer 44, the logic "0" signal is produced at the output of the comparator 46. This signal is fed to the ExOR gate 58. Because "logic "1" is applied to the latter's second input on the signal line 50, a logic "1" is produced at this moment at the latter's output. The logic "1" signal is fed via the AND gate 61 to the reset input of the D flip-flop 62, which is then reset. The AND gate 61, in conjunction with the delay element 63, causes a minimum length of time ΔT1 to be observed, irrespective of the state of the comparator 46, before the D flip-flop 62 is reset. The result of this is that there is a minimum below which the duty factor for transistor 24 does not drop. The duty factor is calculated from the product of the minimum period of time ΔT1 and the frequency of VCO 47, i.e. from ΔT1*FVCO. The minimum period of time ΔT1 is selected in such a way that a residual voltage that ensures that the converter 3 will continue operating is maintained at the capacitor 14 even during the passage through zero. If logic "0" is generated at the output 67, the output of the ExOR gate 59 is set to logic "1". This signal is fed to the power transistor 29 with a delay. At the same time, the negated output 68 goes to logic "1", and this becomes logic "0" at the output of the ExOR gate 60. This signal is fed to the power transistor 24 with no delay. The ground potential thus exists at the point of connection 11 of the two power transistors 24 and 29, as a result of which the current in coil 18 begins to rise again when the mains voltage is positive. This state is maintained until the next switching signal from VCO 47. The mean current, and hence the mean mains input current too, that flows into the converter during a switching cycle is approximately the mean of the negative and positive peak values of current. The negative peak value of current depends in this case only on the switching threshold selected. The difference between the positive peak value and the switching threshold is in many ways dependent on the state in which the converter is operating, e.g. on the VCO frequency and the voltages, but not on the switching threshold itself that is set. It is thus possible, by altering the switching threshold, to alter the mean current by the same amount, which means that the mean converter current can be controlled solely by way of the switching threshold that is set. When the mains voltage is negative, the value of the signal 91 is logic "0" and the input signals to the ExOR gates 59 and 60 passed through the ExOR gates 59 and 60 unchanged, which means that the ExOR gates 59 and 60 have become practically ineffective. The switching signal 100 cause the D flip-flop 62 to be set but, in contrast to what happens when the mains voltage is positive, this now causes the power transistor 29 to be switched on. What is more, the mains diode 21 is conductive when the mains current is negative. The difference between the inverted mains voltage and the output voltage of the converter 2 is thus applied to the input capacitor 14 and the current in coil 18 begins to rise, as is shown at times 83 and 84 in the plot against time in FIG. 4. The microcomputer 44 sets a different, more positive reference value 82. If the value 82 is exceeded, a logic "1" value appears at the comparator output and this is fed unchanged through the ExOR gate 58 and the AND gate 61 to the reset input of the D flip-flop 62. In this way, the D flip-flop 62 is reset, the transistor 29 switched off and the transistor 24 switched on. After this, the point of connection 11 of the two transistors 24 and 29 is at the potential of the output voltage of the converter 2. With the mains voltage is negative and the diode 21 conducting, the current in coil 18 begins to fall again. This state is maintained until such time as the VCO 47 supplies a fresh switching pulse 100. In this case too the AND gate 61, in conjunction with the delay element 63, serves to ensure that a minimum time ΔT1 is observed before the D flip-flop 62 is reset, which however corresponds to the duty factor of the transistor 29. The effect is thus the same as during the positive half-wave. In the same way as in the case of the positive half-wave, but with the sign reversed, the negative mains current too can now be controlled by means of the switching threshold that is set, thus enabling an advantageous mains-current waveform to be obtained.

The curve followed by the reference values 72 and 82 over time is set by the microprocessor in such a way that on the one hand a sine-wave-like waveform as shown in FIG. 7 is obtained for the mains current and on the other hand that the mean of the output voltage from the converter 2 is the desired output voltage of 400 V. For this purpose, a measurement of the output voltage from the converter 2 is fed to the microprocessor via a connection that is not shown. Synchronization with the mains frequency is achieved with the help of the signal from the detection circuit 45.

The invention claimed is:

1. A circuit comprising:
   a first converter for converting an a.c. voltage into a first d.c. voltage and providing said first d.c. voltage as a first output of said circuit, wherein said first converter has a diode half-bridge having two diodes and a first center terminal, a switch half-bridge having two switches and a second center terminal, a high-frequency inductor and two connections in series with the high-frequency inductor, for connection to a source of a main voltage between the two center terminals, a first d.c. rail being connected to the first center terminal by means of a first diode in the diode half-bridge and an electrically conductive connection and to the second center terminal by means of a first switch in the switch half-bridge and an electrically conductive connection, and a second d.c. rail being connected to the first center terminal by means of a second diode in the diode half-bridge and an electrically conductive connection and to the second center terminal by means of a second switch in the switch half-bridge and an electrically conductive connection; and
   a second converter for converting the a.c. voltage into a second d.c. voltage and providing said second d.c. voltage as a second output of said circuit to a controller of said first converter for controlling said first converter.

2. The circuit as claimed in claim 1, wherein the main voltage source, an input of the second converter, and the high-frequency inductor form a series circuit.

3. The circuit as claimed in claim 1, wherein transmission of energy in the second converter is frequency-dependent.

4. The circuit as claimed in claim 1, wherein the second converter is arranged between the high-frequency inductor and the main voltage source.

5. The circuit as claimed in claim 1, wherein at least one of the first converter and the second converter has a transformer.

6. The circuit as claimed in claim 1, wherein at least one of the first converter and the second converter has a resonant capacitor.

7. The circuit as claimed in claim 1, wherein at least one of the first converter and the second converter has an input capacitor.

8. The circuit as claimed in claim 1, wherein at least one of the first converter and the second converter has a control means.

9. The circuit as claimed in claim 8, wherein a voltage at an input capacitor of at least one of the first converter and the second converter is limited by the control means through a limitation of the duty factor of the switches.

10. A power supply system having a circuit as claimed in claim 1.

11. A video projection system having a power supply system as claimed in claim 10.

12. An office electronics or consumer electronics device having a power supply system as claimed in claim 10.

* * * * *